Oct. 22, 1946.    C. J. STAUD    2,409,990
TRACING CLOTH
Original Filed Sept. 16, 1943    2 Sheets-Sheet 1
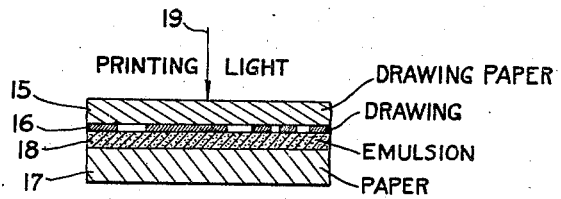
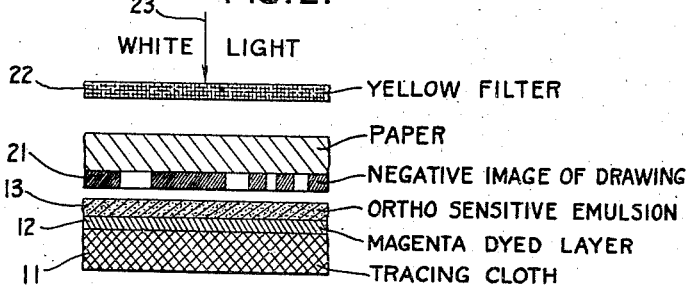
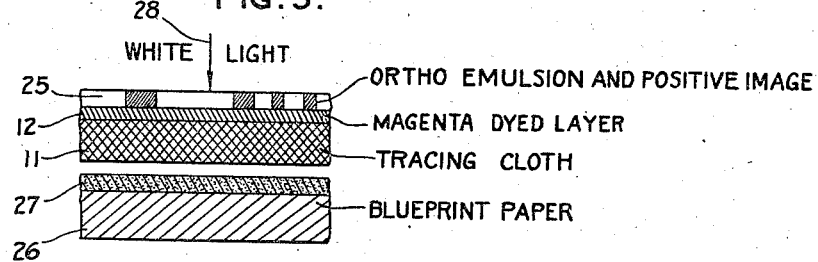
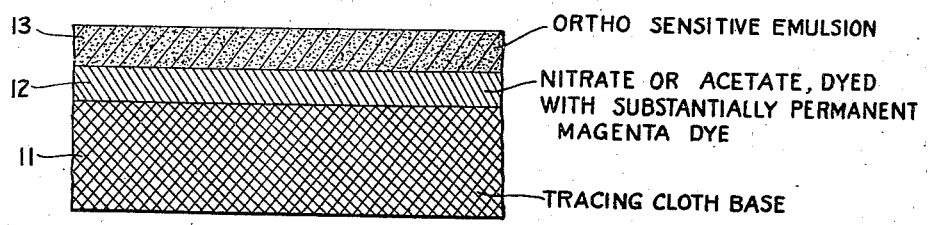
CYRIL J. STAUD
*INVENTOR*
BY
*ATTORNEYS*

Patented Oct. 22, 1946

2,409,990

UNITED STATES PATENT OFFICE 2,409,990

TRACING CLOTH

Cyril J. Staud, Rochester, N. Y.

Original application September 16, 1943, Serial No. 502,591. Divided and this application October 28, 1944, Serial No. 560,873

9 Claims. (Cl. 95—5)

1

The present invention relates to photographic materials and prints made therefrom, and is a division of my copending application 502,591, filed September 16, 1943. More specifically, the invention relates to a sensitized tracing cloth which may be exposed to a drawing or a negative thereof to form an image thereof on the cloth, and which may then be used to print the image onto blue print or other copying paper.

Some difficulty has been experienced from time to time in the use of photographic tracing cloth as a result of halation produced by the diffuse reflection of light from the cloth into the emulsion, with the resultant widening of the lines in the image of the drawing. This effect, while not usually serious, has in certain cases become objectionable in the aircraft industry.

In order to overcome this difficulty, the present invention proposes that instead of using a blue dye in the cloth, as is present practice, an antihalation layer containing a permanent or water insoluble magenta or blue dye or dye mixture be provided. This dye or dye mixture will absorb strongly in the green and will be transparent to or will transmit freely the blue or the blue and red. On a tracing cloth thus colored, an orthochromatic emulsion would be coated. On exposing the emulsion of the tracing cloth to the negative of the drawing, a yellow filter would be used to absorb blue light and transmit red and green. The dye in the antihalation layer would absorb any green light which would pass through the emulsion, and would, therefore, prevent halation thereof and thus provide a positive image on the cloth which is a true and exact reproduction of the original drawing. On the other hand, blue light would be freely transmitted by the dye during the printing operation, and it would, therefore, be unnecessary to remove this dye from the tracing cloth. By means of this arrangement, the positive image on the tracing cloth may be utilized to print onto blueprint paper a positive image which is a substantially true reproduction of the original drawings and superior to reproductions made by prior methods.

The present invention has, therefore, as its principal object, the provision of a photographic member on which may be produced an accurate, halation free, image of a drawing. This member may then be utilized to form substantially accurate working-prints of such a drawing on a suitably sensitized support.

Another object of the invention is the provision of a photographic member having a subbing layer containing a permanent anti-halation dye which will effectively protect the emulsion of the member against halation.

Still another object of the invention is the provision of a permanent anti-halation material which will absorb the light rays used to expose the emulsion to prevent halation thereof, but will freely transmit the light rays used in the printing operation.

Yet another object of the invention is the provision of an emulsion and an anti-halation combination which will enable the emulsion to be exposed to form an image thereon by mean of a light of one color, and which will enable the printing of the image by means of a light of another color.

To these and other ends, the invention resides in certain improvements and combination of parts, all as will be hereinafter more fully described, the novel features being pointed out in the claims at the end of the specification.

In the drawings:

Fig. 1 shows the method of printing a positive image of a drawing onto a paper negative to form a negative image thereon;

Fig. 2 shows the arrangement of the printing light, the paper negative and the tracing cloth of the present invention during exposure of the emulsion of the cloth to form a positive image of the drawing thereon;

Fig. 3 shows the arrangement of the printing light, the tracing cloth with its developed and fixed positive image, and the blueprint paper in position to have the positive image printed thereon;

Fig. 4 is a sectional view of the tracing cloth constructed in accordance with the present invention.

Similar reference numerals throughout the various views indicate the same parts.

Figure 5:
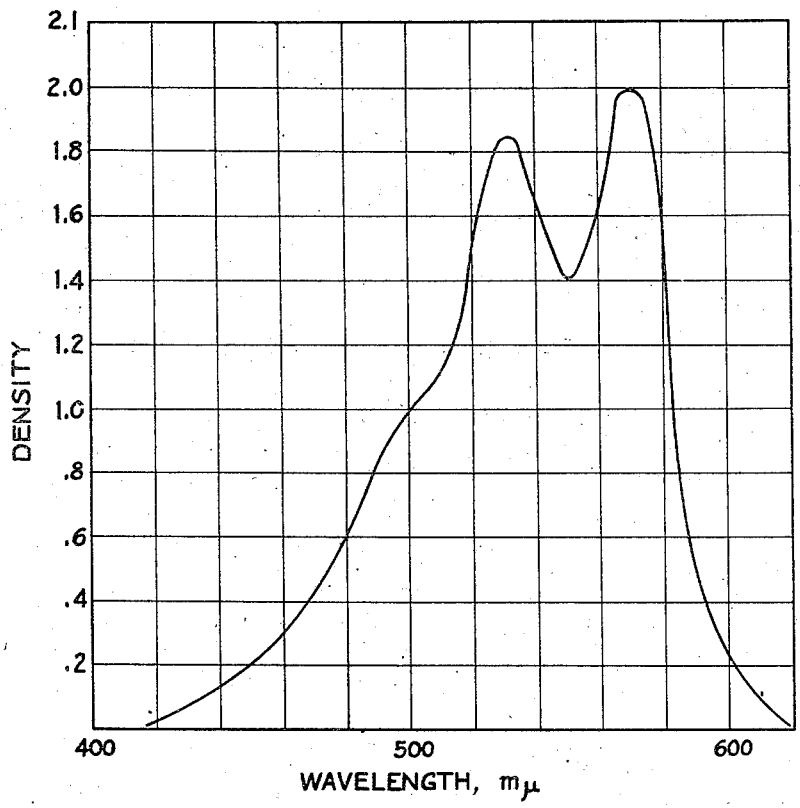
Fig. 5 is a spectrophotometric absorption curve of one dye suitable for use in the anti-halation layer of the cloth illustrated in Fig. 4.

Referring to the drawings, Fig. 4 shows a tracing cloth constructed in accordance with the present invention, and comprising a support 11 of untinted cloth which is rendered translucent or light transmitting in any suitable and well-known manner. The base 11 is coated with an under layer 12 of cellulose acetate or nitrate containing an anti-halation material in the form of a dye or dyes which will absorb strongly in the green, but transmit freely in the blue or blue and red. So far as is known, no satisfactory method has been devised for incorporating a removable anti-halation dye of this type in an under layer.

For this reason, the present invention proposes the use of a permanent or water-insoluble dye or dyes which will remain in place during the processing of the tracing cloth, and which will become a permanent part thereof. Any dye or dyes meeting these requirements may be used. For example, a permanent water insoluble magenta-color dye having the chemical formula 1,4-diamino-2-methoxyanthraquinone, the spectrophotometric absorption curve of which is shown in Fig. 5, is suitable. It is seen from this curve that this dye has a strong absorption in the green and also absorbs somewhat in the orange, but is completely transparent in the violet to 420 mu and transmits blue freely to about 460 mu. The cloth base thus colored is coated with an orthochromatic emulsion 13. A cloth base thus provided with an under layer containing a permanent magenta dye and coated with an orthochromatic emulsion will be free from halation when exposed by green light.

The tracing cloth, above described, is intended for use in forming images of a drawing or similar designation on a sensitized blueprint paper or similar material. In making such blueprints, it is desirable that the lines thereon be substantially identical to those of the original drawings. To secure this result, a negative is first made of the drawing, and then the orthochromatic emulsion layer 13 of the tracing cloth is exposed to the negative to form an halation-free positive image which is an exact reproduction of the original drawing. This positive image is then transferred, by printing, onto the blueprint paper to provide a substantially true and accurate reproduction of the original drawing which may then be used as a working drawing in a manner well known. By means of this method, the blue prints are substantially exact reproductions of the original drawings and are more accurate than blue prints made by prior methods.

Figs. 1 to 3 show the various steps in the formation of the final positive image of the blueprint paper. In Fig. 1, the drawing paper 15 with its drawing or image 16 is placed on a suitable negative paper 17 such as "Kodalith" negative paper, having an emulsion layer 18. The printing light 19 is then passed through the drawing in the manner shown in Fig. 1 to expose the emulsion 18 to form a negative image of the drawing 16 thereon, as is apparent. The negative image in the emulsion 18 is then developed and fixed in the manner well known in the art.

The negative is then arranged to overlie the tracing cloth, see Fig. 2, so that the visual negative image 21 thereon engages the emulsion layer 13 of the tracing cloth. For the purpose of clarity the negative and tracing cloth are shown slightly separated, but it will be understood that in practice they are in actual contact. A yellow filter 22 is used during exposure and is positioned between the exposing light 23 and the paper negative. This yellow filter will absorb blue, but will freely transmit green and red. The transmitted green light will expose the orthochromatic emulsion, which is green and blue sensitive, to form therein a latent positive image of the original drawing 16, as will be apparent. The green light which is effective in exposing the emulsion 13 passes through the latter and is absorbed by the above-mentioned magenta dye in the under layer 12, thus effectively preventing halation of the positive image in the emulsion 13 on the tracing cloth to provide a sharp, clear and true reproduction of the original drawing. The red light transmitted by the emulsion may be allowed to pass through the layer 12 as the emulsion is not sensitive thereto, or, if preferred, the anti-halation dye or dyes may be blue, absorbing both green and red light. Thus, the emulsion layer 13 of the tracing cloth is exposed by a light of one color (green) to form a latent positive image of the drawing 16. The latent positive image is then developed and fixed to provide a visual positive image 25.

The tracing cloth with its positive image 25 is then positioned in the manner shown in Fig. 3, on a blueprint paper 26 having a blue or violet sensitive coating or emulsion 27. For the purpose of clarity the tracing cloth and blueprint paper are shown slightly separated. In actual practice they are in direct contact. A white printing light 28 is then passed through the tracing cloth, in the manner clearly shown in Fig. 3, to print the positive image 25 onto the emulsion layer 27 to form thereon a positive image which is substantially identical with the positive image 25 on the tracing cloth. During this passage of the printing light through the tracing cloth, the dye or dyes in the under layer 12 will absorb the light rays of the green portion of the spectrum but will freely pass or transmit the blue or blue and red rays. The transmitted blue rays are then effective in exposing or printing the emulsion on the light sensitive layer 27, as is apparent. Thus, the printing of the blueprint paper is secured by exposing the emulsion layer 27 thereof to a light of another color, blue, which is not absorbed by layer 12. After the printing is complete, the image on the blueprint paper is developed and fixed to provide a positive image which is a substantial duplication or reproduction of the image of the original drawing. The blueprint may then be used as working drawing, the advantages of which are apparent to those skilled in the art.

By means of the above method, the image 16 of the drawing may be accurately transferred to the blueprint paper 26 to provide a working drawing, the lines of which are substantial duplicates of the original drawings. Furthermore, the inclusion of the permanent magenta dye in the under layer 12 serves to prevent halation of the emulsion layer 13, yet freely passes or transmits the light rays utilized in the printing operation.

While one embodiment of the invention has been disclosed, it is to be understood that the inventive idea may be carried out in a number of ways. This application is, therefore, not to be limited to the precise details described, but is intended to cover all variations and modifications thereof falling within the scope of the appended claims.

I claim:

1. The process of forming a positive photographic print on a material which is sensitive to only one region of the visible spectrum, comprising, providing a printing member having an emulsion which is sensitive to said one region and at least another region and having an anti-halation layer which is transparent to light rays of said one region but which will absorb light rays from said other region to prevent halation of said emulsion, exposing said emulsion to a negative by means of a light containing light rays of said other region to form a positive image on said emulsion, developing and fixing said positive image, and printing said positive image onto said material by exposing the image to light rays of said one region which are freely transmitted by said anti-halation layer to produce a positive image on said material.

2. The process of forming a positive blue print having a coating sensitive only to the blue region of the spectrum, comprising, providing a printing member having an emulsion which is sensitive to the blue region of the spectrum and is sensitive to light rays in other regions of the spectrum and having an anti-halation layer which is transparent to light rays in the blue region but which will absorb light rays of said other regions to protect the emulsion against halation, exposing said emulsion to a negative by means of light rays in said other regions to form a positive image on said emulsion, developing and fixing said image, and printing said positive image onto said blue print by exposing the image to a blue light which is freely transmitted by said layer to produce a positive image on said blue print.

3. The process of forming a positive blue print on a materail having a coating sensitive only to the blue region of the spectrum, comprising, providing a printing member having an orthochromatic emulsion, and a layer containing a dye capable of absorbing green light to protect the emulsoin against halation but permitting the free pass of blue rays, exposing said emulsion to a negative by means of green light to form a positive image in said emulsion, developing and fixing said positive image, and then printing said positive image onto said material by exposing said image to a blue light to form a positive image on said blue print material.

4. The process of forming a positive photographic print on a material which is sensitive only to the blue region of the spectrum, comprising, providing a printing member having an emulsion which is sensitive to the blue and green regions of the spectrum, and also having a layer containing a dye sensitive to blue and red, exposing said emulsion to a negative by means of a green light to form a positive image in said emulsion, developing and fixing said positive image, and then printing said positive image onto said material by exposing said image to a blue light to form a positive image on said material.

5. The process of forming a positive photographic print on a material sensitive to only the blue region of the spectrum, comprising, providing a negative, providing a printing member having an emulsion which is sensitive to the blue and green regions of the spectrum, exposing said emulsion by passing a green light through the negative and the emulsion to expose the latter, allowing said light to then pass into a layer containing a magenta dye which will absorb the green light to prevent halation of said emulsion but which will freely transmit blue light, developing and fixing the emulsion on said member, and then printing on said material by passing a blue light through said emulsion and dye layer.

6. The process of forming a positive photographic print on a material sensitive to only the blue region of the spectrum, comprising, providing a negative, providing a printing member having an emulsion which is sensitive to the blue and green regions of the spectrum, exposing said emulsion by passing a green light through the negative and the emulsion to expose the latter, allowing said light to then pass into a layer containing a magenta anthraquinone dye which will absorb the green light to prevent halation of said emulsion but which will freely transmit blue light, developing and fixing the emulsion on said member, and then printing on said material by passing a blue light through said emulsion and dye layer.

7. The process of forming a positive photographic print on a material sensitive to only the blue region of the spectrum, comprising, providing a negative, providing a printing member having an emulsion which is sensitive to the blue and green regions of the spectrum, exposing said emulsion by passing a green light through the negative and the emulsion to expose the latter, allowing said light to then pass into a layer containing a magenta alkoxy anthraquinone dye which will absorb the green light to prevent halation of said emulsion but which will freely transmit blue light, developing and fixing the emulsion on said member, and then printing on said material by passing a blue light through said emulsion and dye layer.

8. The process of forming a positive photographic print on a material sensitive to only the blue region of the spectrum, comprising, providing a negative, providing a printing member having an emulsion which is sensitive both to the blue and the green regions of the spectrum, providing a yellow filter which will pass green and red but which will absorb blue, exposing said emulsion by directing a white light onto said filter so that only green and red light are transmitted to the emulsion to expose the latter, providing said member with a layer having incorporated therein a permanent dye which will absorb light of the green region after the passage thereof through said emulsion to prevent the halation thereof but which will freely transmit blue light, developing and fixing the exposed emulsion, and then printing on said material by passing a blue light through said emulsion and dye layer.

9. The process of forming a positive photographic print on a material sensitive to only the blue region of the spectrum, comprising, providing a negative, providing a printing member having an ortho-chromatic emulsion, providing a yellow filter which will pass green light but will absorb blue, exposing said emulsion to green light by directing a white light onto said filter positioned between the light and emulsion, providing said member with a layer having incorporated therein a permanent dye transparent to blue but capable of absorbing in the green region of the spectrum so as to absorb the green light after the passage thereof through said emulsion to prevent halation thereof, developing and fixing the exposed emulsion, and then exposing the printing member to white light the green portion of which will be absorbed by said dye but the blue portion of which will be freely transmitted to expose said material.

CYRIL J. STAUD.